Aug. 18, 1959

L. P. FLATLAND 2,899,745

DENTAL ANGLE DEVICE

Filed Oct. 11, 1957

INVENTOR.
LLOYD P. FLATLAND
BY *Lothrop & West*
ATTORNEYS

Aug. 18, 1959 L. P. FLATLAND 2,899,745
DENTAL ANGLE DEVICE
Filed Oct. 11, 1957 2 Sheets-Sheet 2

INVENTOR.
LLOYD P. FLATLAND
BY Lothrop & West
ATTORNEYS

United States Patent Office 2,899,745
Patented Aug. 18, 1959

2,899,745

DENTAL ANGLE DEVICE

Lloyd P. Flatland, San Francisco, Calif.

Application October 11, 1957, Serial No. 689,696

3 Claims. (Cl. 32—28)

The invention relates generally to the class of devices in the dental art known as angle hand pieces, and, more particularly, to angle devices in which the dental instruments used therein, such as burrs, are rotated at extremely high velocities.

High speed devices of this general nature are shown and described in my co-pending applications No. 534,427 of September 15, 1955; No. 613,223 of October 1, 1956, and No. 621,760 of November 13, 1956.

The foregoing devices are especially utilized in conjunction with conventional dental units and derive their rotational force from the customary drive cords associated with such dental units.

While such units are extremely satisfactory for many purposes and in many environments, for example, in the usual dental office, the bulkiness of the conventional dental unit renders difficult the performance of any dental work in a location remote from well equipped facilities, a small ship or remote outpost being exemplary.

Furthermore, the terminal mechanisms such as the joints, pulleys and contra-moving cords of the customary dental unit and conventional hand piece often make difficult the free and unhindered manipulation of the piece.

It is therefore an object of the invention to provide an angle device which is light, well-balanced and unencumbered by the usual dental unit attachments and which is therefore extremely manipulable.

It is another object of the invention to provide a device which, while being highly suitable for use with a conventional dental unit, does not depend upon such a unit for its motive power.

It is yet another object of the invention to provide an angle device which can be used, if necessary, at a location remote from an established dental facility.

It is still another object of the device to provide a high speed angle device which is extraordinarily long-lived owing to the maintenance of pressurized air adjacent the rotating parts, and which consequently prevents the access to such parts of harmful material such as grit, abrasives and moisture during operation of the device.

It is a further object of the invention to provide an angle device in which the rotating parts are subjected to minimum frictional losses.

It is yet a further object of the invention to provide an angle device in which the area being excavated is subjected to a continuous, directed water spray serving to cool the area and wash away abraded particles.

It is still a further object of the invention to provide an angle device in which the driving mechanism is cooled so as to avoid temperature rise, and thus to lengthen the life of such mechanism.

It is still another object of the invention to provide a high speed angle device which, while being substantially self-contained, can very advantageously be integrated with a dental unit and related equipment in the ordinary dental office.

It is another object of the invention to provide a generally improved angle device.

Other objects, together with the foregoing, are attained in the embodiments described in the following description and shown in the accompanying drawings in which.

Figure 1:
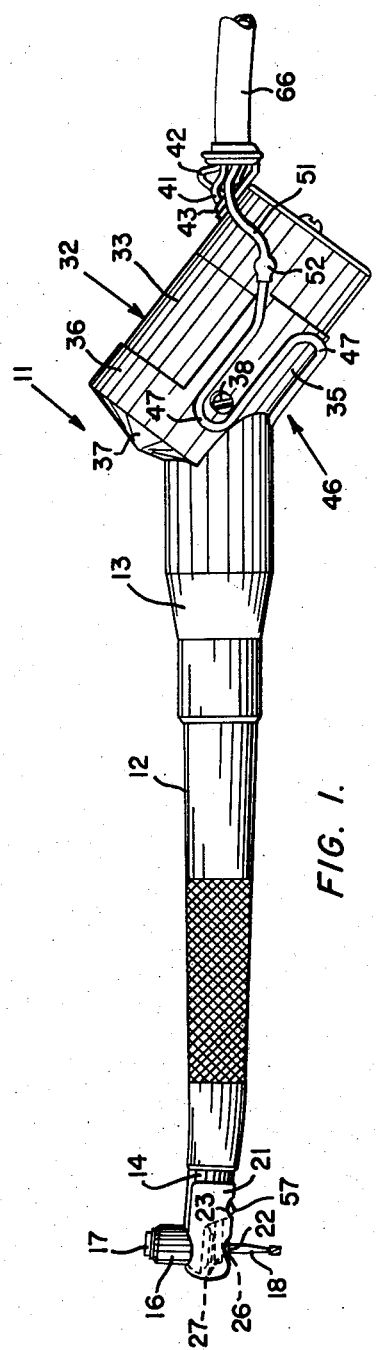
Figure 1 is a side elevation, a portion of the utilities conduit being broken away to reduce the extent of the figure.
Figure 3:
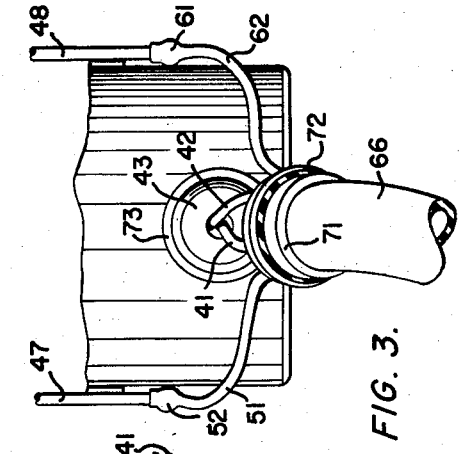
Figure 3 is a rear elevation of the structure shown in Figure 2.
Figure 2:
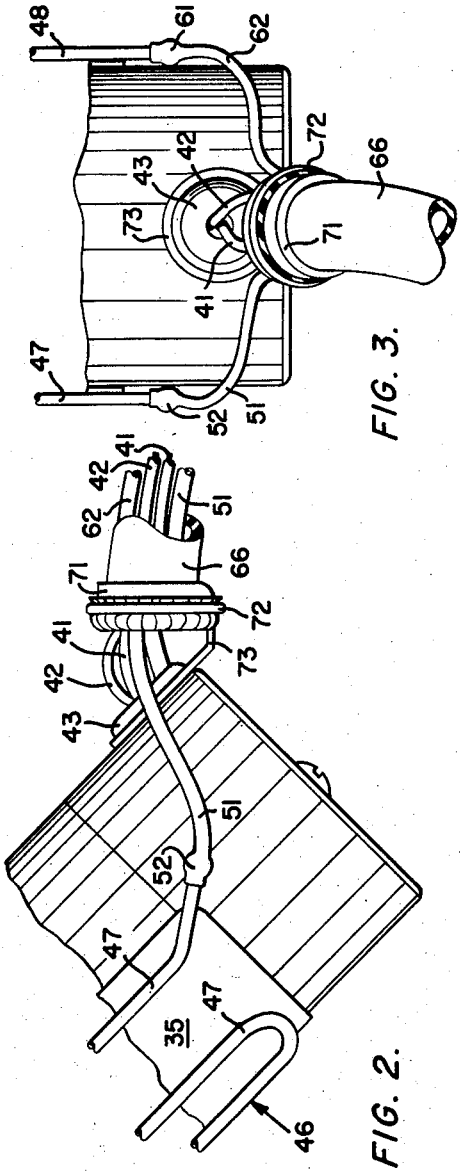
Figure 2 is a side elevation, to an enlarged scale, of the utilities conduit mounting at the base of the driving motor.

While the device of my invention is susceptible of numerous physical embodiments, depending upon the environment and requirements of use, a substantial number of the herein shown and described embodiments have been made and used and have performed in a highly satisfactory manner.

The dental angle device, generally characterized by the numeral 11, comprises an elongated hollow sheath 12, generally circular cylindrical in configuration but having a slight taper converging in a direction away from a sheath base 13. The sheath 12 terminates at its outermost end in a hollow circular cylindrical barrel 14 having mounted thereon in a direction substantially transverse to the sheath axis a high speed dental instrument mounting and rotating unit 16, depression of a button 17 on the unit enabling the dentist to insert or withdraw a dental instrument 18 of conventional kind, such as a burr. The construction and operation of high speed units of this general nature are more fully covered in my co-pending applications specified above.

Enclosing the forward end of the barrel 14, is a sleeve 21, or guard, the guard having formed therein a forward circular aperture 22, circumscribing the dental instrument, and a rearward opening 23. The guard 21 is in tight frictional engagement with the barrel 14, and except for the above mentioned aperture and opening, caps the end of the sheath in air-tight fashion.

The burr 18 is rotated at extremely high velocity, rotation being effected by rotation of a pulley 26 driven by an endless belt 27 reeved about the pulley 26. The belt 27, in turn, is driven by a drive pulley 31 mounted on one end of the rotating shaft of an electric motor, generally designated by the numeral 32 and shown most clearly in Figure 4.

Figure 4:
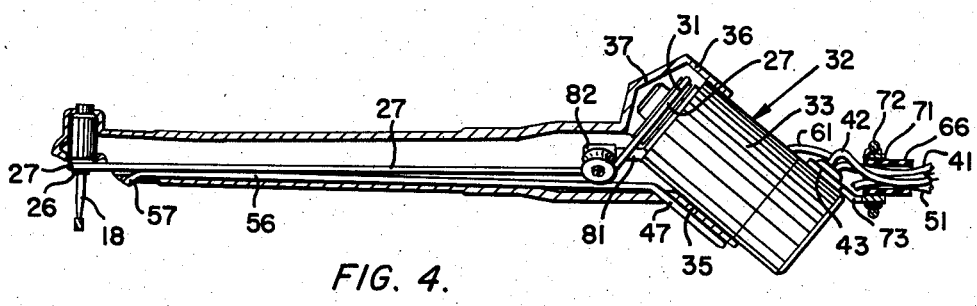
Figure 4 is a median vertical longitudinal section.
Figure 5:
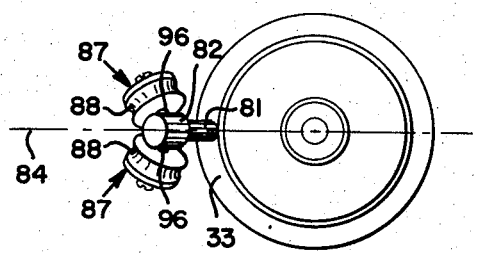
Figure 5 is a plan, viewed along the motor axis, of the motor and the idler pulleys, the motor housing being broken away to show the interior structure.

The electric motor 32 includes a circular cylindrical motor casing 33 whose upper end, as appears most clearly in Figures 1 and 4, is enclosed in substantially air-tight relation by a housing 36, the housing including a conical cover 37 or cap, the motor being secured to a downwardly extending skirt 35 of the housing 36 as by a fastening 38. Supplying electrical energy to the motor 32 is a pair of conductors 41 and 42 entering the motor casing through a suitable grommet 43. The motor is preferably of the high speed type capable of running on direct current having voltages ranging between six to twenty-four volts, and therefore capable of being actuated by a battery, thus permitting use in remote locations not having a regular power source.

Since the motor rotates at high velocities, at times approaching or even exceeding 23,000 r.p.m., the temperature of the motor tends to rise considerably. Extended periods of heating reduce the effective motor life. Consequently, I have provided cooling apparatus for maintaining the motor temperature at approximately ambient temperature regardless of running time and motor velocity.

The cooling apparatus, generally designated 46, comprises a pair of tubular coils 47 and 48 mounted in sinuous fashion and in close-coupled, heat-exchanging manner (as by silver-soldering) on opposite sides of the motor housing skirt or cradle 35.

One of the tubes, for example the tube 47, is connected to a flexible tubing 51, through a nipple 52, the tubing 51 leading to a water supply. The water passes through the sinuous coil 47, thereby extracting heat from the motor, and moves forwardly through a forward extension 56 of the tube coil 47, the water discharging outwardly through a nozzle 57 directed toward the cutting portion of the burr 18, the nozzle protruding slightly through the opening 23 in the guard 21. Preferably, the forwardly extending tube 56 is disposed within the sheath in order to preserve a smooth outer sheath contour.

In comparable fashion, the other tube 48, or coil, is connected through a nipple 61 to a source of pressurized air. The air, while not having the considerable specific heat content of the water, is also effective to reduce the motor temperature and, in conjunction with the water coils 47, keeps the motor at a satisfactorily low temperature during all periods of use.

The air coil tube 48 is led interiorly of the sheath base 13 and discharges into the sheath cavity at a location slightly removed from the intersection of the motor housing skirt 35 and the sheath. The air discharge maintains a higher than atmospheric pressure within the sheath. Consequently there is a continuous outward discharge of air around the periphery of the base of the burr 18, the air discharging through the aperture 22 in the guard and passing downwardly along the instrument, cooling the instrument as it goes. The outward flow of air is also highly effective in preventing the entry through the aperture 22 of grit, moisture, abrasives and other deleterious matter frequently existing in the area adjacent the dental instrument during periods of use.

While the angle device 11, owing to its weight and shape, is a highly manipulable apparatus, the slight drag exerted by the conductors 41 and 42 and the tubings 51 and 62 is reduced to a minimum. This is accomplished by disposing the conductors and tubings in a utilities conduit 66 and mounting the conduit so that its axis is substantially coaxial with the axis of the sheath. With this arrangement, rotation of the sheath around its own axis results in but a very slight drag or resistance from the utility members. Conveniently, the end of the conduit 66 is inserted through a ring 71, or grommet, the conduit being peeled or recurved back over the outside of the ring, with a band 72 holding the peeled back portion tightly in place. The ring 71 is supported by a suitable inclined bracket 73 mounted on the motor casing and conveniently being integrally formed with the conductor grommet 43. A short longitudinal cut in the lowermost side of the peeled back portion of the conduit 66 enables the conduit to be freely skinned back in the area adjacent the junction of the bracket 73 and the ring 71.

It is obvious that with rotational velocities of the order obtaining herein, inertial problems may be expected, the belt, for example, having a tendency to maintain its tangential direction where it takes off from the peripheries of the pulleys, particularly the drive pulley 31. Provision is therefore made for controlling and guiding the runs of the belt 27 in such fashion that even at every high pulley and belt speeds, a smooth, quiet, vibrationless condition obtains, a situation of extreme importance to doctor and patient alike.

Mounted on the upper inner end of the motor casing 33 is a bracket 81 substantially coaxial with the sheath axis, the distal end of the bracket having secured thereto a cylindrical mounting block 82. A pair of drilled and tapped openings (not shown) in the block receive in threaded engagement a pair of idler pulley axles 83, the axles being threaded as appears most clearly in Figure 6. The openings are each inclined at a predetermined angle with respect to a median vertical plane 84 through the bracket 81 and the block 82, this angle being preferably 62½ degrees. The mutual axis of the bracket 81 and the block 82 also subtends a predetermined angle with respect to the rotational axis of the motor and the drive pulley 31, this angle being 38 degrees. Furthermore, it is sometimes desirable that the two axes of rotation of a pair of idler pulleys 87 mounted on the pair of axles 83 each be so inclined with respect to the other that the median plane of each of the grooves 88 in the idlers converges at a predetermined angle, the angle of convergence being a function of such factors as the length of belt run and the diameter of the driven pulley 26. Dimensions are selected so that each of the belt runs between the drive pulley 31 and the corresponding idler pulley forms, in effect, a tangent; and, in comparable fashion, each of the belt runs between the driven pulley 26 and the corresponding one of the idler pulleys defines a tangent line. As a consequence, as a point on the belt takes off from the rim of the drive pulley and moves toward the groove in the adjacent idler, the point moves in substantially a straight line. As the point rounds the idler pulley it is guided or directed in a straight line direction toward the corresponding rim of the driven pulley 26. The idler pulleys, in other words, are transition elements, one of the pulleys serving on the outer run of the belt to "collect" the belt as it leaves the drive pulley and to head the belt linearly toward the driven pulley 26. On the return run, the opposite pulley "spreads" the belt and guides it toward the rim of the larger diameter drive pulley 31. Bowing of the belt runs is thereby obviated and a smooth, quiet operation is obtained.

Silent, vibrationless operation is further assisted by the careful construction of the idler pulleys 87, themselves.

Figure 6:
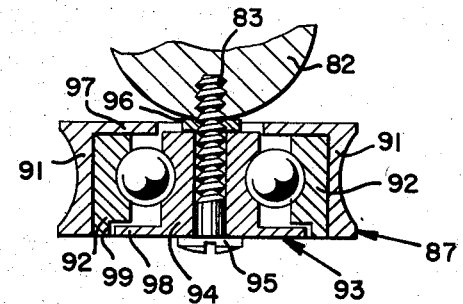
Figure 6 is a diametral section, to an enlarged scale, of an idler pulley.

The pulley rim 91, as appears most clearly in Figure 6, is mounted on the outer race 92 of an anti-friction bearing 93, the inner race 94 encompassing the axle 83 and being clamped thereto as the head 95 on the axle 83 is rotated and the axle tightly threaded into the block 82. In other words, the inner race 94 is clamped between an annular retaining member 96 and the head 95. The rim 91 includes an inwardly extending flange 97 closely approaching the adjacent corner of the inner race 94. In somewhat comparable fashion, the inner race 94 is provided with an outwardly extending flange 98 disposed in close juxtaposition in relation to a step 99 in the outer race 92. The close tolerances obtaining permits of long-lasting packing of lubrication within the bearing, thus lengthening the life of the idlers and reducing down-time for repairs.

Figure 7:
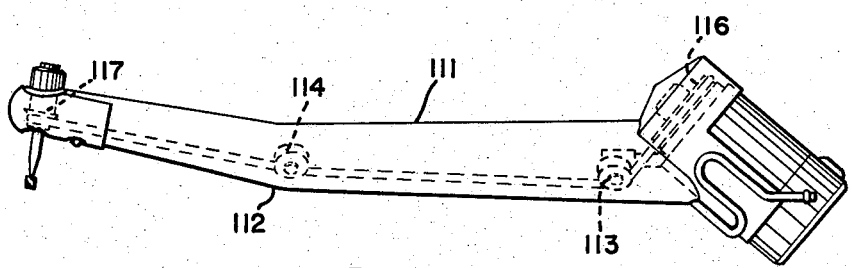
Figure 7 is a side elevation of a modified form of the device, the sheath being bent to approximately a 15° angle to assume the shape of conventional present-day pieces.

Figure 7 illustrates a somewhat modified form of the device, the structure differing mainly in the inclination (ordinarily 15 degrees) given to a sheath 111, a knee 112 being formed thereby. In order to maintain the smooth, effortless belt motion desired, a first set or pair of idler pulleys 113, comparable to those described above, is supplemented by a second pair of idler pulleys 114, the idlers 113 and 114 being so inclined and oriented that each of the belt runs between the drive pulley 116, the idlers 113 and 114 and the driven pulley 117 are in effect tangential with respect to the corresponding and adjacent pulley rims.

It can therefore be seen that I have provided an angle device which, among other advantages, is compatible with present-day dental units, is more easily manipulated than present-day equipment, is usable where full dental facilities are not available, and enables both dentist and pa-

I claim:

1. A dental angle device comprising an elongated hollow sheath, a dental instrument rotating unit mounted transversely on one end of said sheath, said unit including a driven pulley, a guard detachably mounted on said one end of said sheath and covering said one end of said sheath, said guard having an aperture circumscribing a dental instrument disposed in said unit, a cylindrical housing mounted on the other end of said sheath, the axis of said housing being inclined to and in intersecting relation with the axis of said sheath, a first tubing adapted to convey water mounted on the exterior surface of said housing in sinuous and close-coupled heat transferring relation therewith, said first tubing being led interiorly of said sheath and forwardly therein to a location adjacent said guard aperture, a second tubing adapted to convey pressurized air mounted on the exterior surface of said housing in sinuous and close-coupled heat transferring relation therewith, said second tubing being led interiorly of said sheath and opening therein forwardly of said housing, an electric motor mounted in said housing in air tight relation thereto, said motor including a driving pulley, and an endless belt reeved about said driving pulley and said driven pulley.

2. The device of claim 1 further characterized by a bracket mounted on the rear end of said motor, a flexible hose mounted on said bracket, the axis of said hose adjacent said bracket being substantially coaxial with the axis of said sheath, a pair of electrical conductors disposed in said hose and leading therefrom into said motor, a flexible water-conducting tube disposed in said hose and connected to said first tubing, and a flexible air-conducting tube disposed in said hose and connected to said first tubing, and a flexible air-conducting tube disposed in said hose and connected to said second tubing.

3. An angle device comprising an elongated hollow sheath substantially air-tight except for a transverse aperture adjacent one end, said aperture circumscribing a dental instrument rotatably mounted on said sheath at said one end thereof, a first pulley rotatably mounted on said sheath adjacent the other end thereof, means for rotating said pulley, means for conducting pressurized air into said sheath, said air conducting means being in face to face contact with said pulley rotating means whereby a portion of the heat generated by said pulley rotating means is transferred to said air conducting means, a second pulley rotatably mounted on said one end of said sheath coaxially with said dental instrument, means for connecting said first pulley and said second pulley, and a pair of idler pulleys interposed between said first pulley and said second pulley, said idler pulleys being in contact with said pulley connecting means and inclined with respect to said first and said second pulleys whereby said connecting means form a common tangent between said idler pulleys and said first pulley and between said idler pulleys and said second pulley.

References Cited in the file of this patent

UNITED STATES PATENTS

| | | |
|---|---|---|
| 2,078,859 | Lapham | Apr. 27, 1937 |
| 2,124,831 | Roos | July 26, 1938 |
| 2,824,370 | Page | Feb. 25, 1958 |